United States Patent [19]

Giles, Jr.

[11] Patent Number: 4,567,105

[45] Date of Patent: Jan. 28, 1986

[54] MULTILAYER POLYCARBONATE ARTICLE

[75] Inventor: Harold F. Giles, Jr., Cheshire, Mass.

[73] Assignee: General Electric Company, Mt. Vernon, Ind.

[21] Appl. No.: 630,870

[22] Filed: Jul. 13, 1984

[51] Int. Cl.$^4$ .................... B32B 27/08; B32B 27/36
[52] U.S. Cl. .................... 428/412; 156/334; 428/516; 428/520
[58] Field of Search .............. 428/412, 516, 520; 525/469, 227, 146; 524/267; 528/196; 156/334

[56] References Cited

U.S. PATENT DOCUMENTS

| | | | |
|---|---|---|---|
| 2,999,835 | 9/1961 | Goldberg | 524/267 |
| 3,028,365 | 4/1962 | Schnell et al. | 528/196 |
| 3,334,154 | 8/1967 | Kim | 525/469 |
| 3,876,452 | 4/1975 | Anspon et al. | 156/334 |
| 4,386,124 | 5/1983 | Akao | 428/412 X |

Primary Examiner—Thomas J. Herbert
Attorney, Agent, or Firm—Martin B. Barancik

[57] ABSTRACT

A multilayer composition comprising an outer layer of aromatic polycarbonate, an outer layer of a polymer prepared from an olefinic monomer, said outer layers tied together with a layer comprising an admixture of an olefin acrylate polymer and poly-(4-methylpentene-1), the olefin acrylate and poly-(4-methylpentene-1) in such quantities that the adhesive strength and clarity of the tie layer is not significantly reduced after exposure to hydrolytic conditions at elevated temperatures.

9 Claims, No Drawings

MULTILAYER POLYCARBONATE ARTICLE

BACKGROUND OF THE INVENTION

Multilayer compositions have been utilized for many years. The concept of a multilayer is that the positive properties of two or more materials are combined with the structural integrity of each material being essentially uncompromised. Usually the positive properties of one material off-set or counter balance the weaker properties of the second material. For example, among the positive properties of polycarbonate are high heat resistance and impact strength. However polycarbonate has a relatively high transmission rate for certain gases, oxygen and carbon dioxide for example. Polyvinyl chloride does not have very high resistance to impact or heat but has excellent resistance to the transmission of oxygen and carbon dioxide. Therefore a multilayer composition utilizing polycarbonate adjacent to polyvinylchloride can be employed in structures wherein the properties of high impact resistance, high heat resistance and high resistance to oxygen and carbon dioxide transmission are necessary.

Although many of these multilayer compositions can be hypothesized on the basis of laminating a material possessing certain strong properties with a material having weaknesses in those same property areas, certain practical considerations inhibit successful implementation of this theory. The two materials are in intimate contact at their interface. This juncture or interface should provide a sufficiently strong interaction with respect to the processing conditions which the multilayer structure undergoes that a tight, firm bond is maintained. Such conditions to which the multilayer can be exposed include heat, pressure, humidity, liquid chemicals, gases and the like or various combinations of these conditions. The propensity of the two layers to maintain this tight, firm bond is generally known as the "compatibility" of the two layers. When the two materials are incompatible, the utility of the multilayer structure is severely inhibited or useless. In order to bind two relatively incompatible layers, a tie layer is generally employed joining the two incompatible layers by "tieing" them together. This tie layer usually enjoys good compatibility with both incompatible layers and is aligned between the two incompatible layers.

Aromatic polycarbonate is a particularly useful material for multilayer technology because of its high heat and impact resistance. However, it is incompatible to a varying degree with a number of other resins. Of particular concern is its incompatibility with olefin containing resins.

A novel tie material has been developed. This tie material is particularly effective for tieing aromatic polycarbonate with olefin containing polymers. This tie layer provides a multilayer structure which has increased hydrolytic stability.

DESCRIPTION OF THE INVENTION

In accordance with the invention there is a novel composition of matter which comprises an admixture of an olefin acrylate and a poly-(4-methylpentene-1). In further accordance with the invention is a multilayer structure comprising an outer layer of aromatic polycarbonate and an outer layer of a polymer prepared from an olefinic monomer, said outer layers tied together with a layer comprising an admixture of an olefin acrylate polymer and a poly-(4-methylpentene-1), the olefin acrylate and poly-(4-methylpentene-1) in such quantities that the adhesive strength and clarity of the tie layer is not significantly reduced after exposure to hydrolytic conditions at elevated temperatures.

A further aspect of the invention is a composition comprising a blend of
(a) a major amount of an aromatic polycarbonate and a polyolefin and
(b) a minor amount of an olefin acrylate polymer and poly-(4-methylpentene-1).

Aromatic polycarbonates are prepared in the conventional manner by reacting a dihydric phenol with a carbonate precursor in an interfacial polymerization process or transesterification. Typical of some of the dihydric phenols that may be employed in the practice of this invention are 2,2-bis(4-hydroxyphenyl)propane (bisphenol-A), (2,2-bis(4-hydroxy-3-methylphenyl)propane, 4,4-bis(4-hydroxyphenyl)heptane, 2-2(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxyphenyl)methane, bis 4-hydroxy phenyl sulfone and bis 4-hydroxy phenyl sulfide. Other dihydric phenols of the bisphenol type are also available and are disclosed in U.S. Pat. Nos. 2,999,835; 3,028,365 and 3,334,154. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di(chlorophenyl) carbonate, di-(bromophenyl) carbonate, di-(trichlorophenyl) carbonate, di(tribromophenyl) carbonate, etc., di-(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bis-chloroformates of hydroquinone), or glycols (bis-haloformates of ethylene glycol, neopentyl glycol, polyethylene glycol, etc.). While other carbonate precursors will occur to those skilled in the art, carbonyl chloride, also known as phosgene, is preferred.

The aromatic polycarbonates of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate or an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptyl-ammonium iodide, tetra-n-propyl ammonium; bromide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl, hydroxyl (polyfunctional phenols) or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polymer and a branched polymer.

Within the definition of aromatic polycarbonates are also copolyestercarbonates, that is the polymer made from a dihydric phenol, a dibasic acid and a phosgene precursor. U.S. Pat. No. 3,169,121 covering copoly estercarbonates and methods of preparing them is hereby incorporated by reference.

The other outer layer in the multilayer structure is a polyolefin. Typical of the polyolefins are polyethylene, polypropylene, polybutylene, polyisobutylene or any of the olefin monomers having from two to about ten carbon atoms, preferably from two to about eight carbon atoms. Copolymers of the above may be employed, and are included within the term polyolefin. Examples of copolymers include copolymers of ethylene and propylene or ethylene and butene. The term copolymers includes the usual copolymers, that is, random, random-block and block copolymers. Various densities of polyolefins can be employed in this invention and include high density polyethylene, linear low density polyethylene and low density polyethylene. The preferred polyolefin is polypropylene. It is preferred that the polyolefin not be poly-(4-methylpentene-1).

The internal tie layer joining together the aromatic polycarbonate and the polyolefin outer layers is an admixture of an olefin acrylate copolymer and poly-(4-methylpentene-1). The olefin concentration in the olefin acrylate is generally from about 90 to about 60 weight percent, preferably from about 70 to about 85 weight percent. The olefin employed is any of the olefins previously mentioned for the polyolefin. However an olefin of from two to about four carbon atoms is preferred. Ethylene is the most preferred olefin. The acrylate has an alkyl or cycloalkyl ester group. The alkyl is normal or branched and is generally from one to six carbon atoms, inclusive. Examples of alkyl include methyl, ethyl, isopropyl, tertiary butyl, neopentyl and n-hexyl. Normal alkyl groups are preferred. Generally, cycloalkyl groups of from four to six carbon atoms, inclusive can be employed and include cyclobutyl, cyclopentyl and cyclohexyl. Preferred acrylate are methacrylate and ethylacrylate.

The poly-(4-methylpentene-1) is commercially available and is made by art known techniques.

The proportion of olefin acrylate to poly-(4-methylpentene-1) can vary significantly and still retain the excellent resistance to hydrolytic conditions and clarity which characterize the tie layer. Generally, olefin acrylate to poly-(4-methylpentene-1) weight ratio of from about 95:5 to about 65:35, preferably of from about 92:8 to about 70:30 provide very good hydrolytic stability to the multilayer structure. All olefin acrylate provides good adhesion strength initially but has unacceptable hydrolytic stability. Additionally, clarity of the material after exposure to hydrolytic conditions at high temperature is substantially reduced. All poly-(4-methylpentene-1) does not provide acceptable adhesion between layers.

The particular tie layers employed in this invention are unique in that the adhesive strength of the tie layer is not significantly reduced after exposure to hydrolytic conditions at elevated temperatures. Clarity also remains essentially the same or is only minimally reduced. Standard tie layers show a significant reduction in adhesive strength. The test of a T pull on an Instron measuring device is considered to be the standard for this invention. "Hydrolytic conditions at elevated temperature" for this invention are autoclaving at 121° C. for a period of 30 minutes or even higher temperature to provide a more stressful test. A "significant reduction in adhesive strength" is a reduction of about 50% or greater of the original T pull value.

The multilayer structures can be readily prepared by standard techniques, including co-extrusion through a feedblock or combination in the die. The thickness of the layers may vary substantially and are obviously somewhat dependent upon the final use to which the multilayer structure will be applied. Generally from about 0.25 mil to about 60 mil thickness of each outer layer can be employed. The layers, however, are preferably from about 0.5 to 30 mil. The tie layer is usually significantly thinner than the outer layer. Normally the tie layer will be thinner than 1 mil. Tie layers of up to 5 mil can also be employed.

With reference to the outer layer, it need not be the final outer layer of the structure. It is only "outer" with respect to the tie layer. Each of the aromatic polycarbonate and polyolefin layers may also be adjacent to layers of other polymers or even a thin metal strip.

The multilayer structure may comprise a simple laminate useful, for example, as a tray or can be thermoformed or blow-molded into a variety of structures including containers of various types.

In preparing laminates or containers of the invention, there can be significant wasteage of the multilayer material. An example of such material is the scrap material prepared when the pinch-off is made in co-extrusion blow molding. A further example of such material is containers of the multilayer material which have outlived their usefulness. These multilayer scrap materials are reground thus forming a blend of their components. The outer layers, i.e. the polycarbonate and the polyolefin are a major weight percent of the blend, generally above about 70 weight percent, preferably above about 85 weight percent of the blend. The tie layer will be a minor amount of the blend. In the reground materials of this invention, the admixture of olefin acrylate and poly-(4-methylpentene-1) is a minor amount of the reground composition, the aromatic polycarbonate and polyolefin forming the major quantity. Generally the minor quantity of the composition will be present in such quantities that if it were a tie layer between the two components of the major quantity, the adhesive strength and clarity of the tie layer would not be significantly reduced after exposure to hydrolytic conditions at elevated temperature. A major weight quantity of the (b) component of the blend is the olefin acrylate, generally from about 65–95 weight percent, preferably from about 70 to about 92 weight percent. Obviously all the other definitions within the specification apply equally as well to the aromatic polycarbonate, polyolefin, olefin acrylate and poly-(4-methylpentene-1).

The blend can be injection molded into various parts and utilized wherein an aromatic polycarbonate can be employed. A molded article with greater environmental stress resistance (resistance to gasoline) as well as easier processability in preparation is formed.

Below are examples of the invention. They are intended to exemplify the broad nature of the invention rather than be restrictive of the broad concept.

Samples for Instron testing were prepared by cutting 1 inch by 8 inch strips from 4 mil film made on the 1.5 inch single screw extruder under the following conditions.

LEXAN® 101[A] 490°/490°/500°/500° F. die 460/460
Polypropylene[B] 350°/360°/370°/370° F. die 350/350
EEA[C]/TPX[D] 450°/460°/470°/480° F.

[A] Bisphenol-A polycarbonate, intrinsic viscosity in methylene chloride at 25° C. is 0.53–0.56 from General Electric Company
[B] Shell homopolymer 5820, MFI=12
[C] Ethylene ethylacrylate, DPD6169 Union Carbide and
[D] Poly-(4-methylpentene-1).TPX MX-004

The temperatures are taken along the bore starting at the feed throat.

These strips were heat sealed at 520° F. and 60 psi for 15 seconds. Some samples were tested on the Instron in the T pull test. Other samples were autoclaved for a period of 30 minutes at 121° C. prior to T pull testing. Below are the results

CONTROL 1

This control was designed to show the degree of adhesion between two bisphenol A polycarbonate layers with an EEA (ethylene ethylacrylate)/TPX[poly(4-methylpentene 1)] tie layer.

TABLE 1

| TIE LAYER COMPOSITION WEIGHT RATIO EEA/TPX | 180° INSTRON PEEL STRENGTH LBS/LINEAR INCH |
|---|---|
| 100/0 | 7.4 |
| 95/5 | 6.9 |
| 90/10 | 5.6 |
| 85/15 | 5.5 |
| 80/20 | 6.5 |
| 70/30 | 4.9 |
| 60/40 | 3.0 |
| 50/50 | 1.2 |

As is observed from the results, the more TPX the lower the amount of adhesion as shown by the lower amount of force necessary to pull apart the multilayer film.

CONTROL 2

This control was designed to show the degree of adhesion between two polypropylene layers with a EEA/TPX tie layer.

TABLE 2

| TIE LAYER COMPOSITION WEIGHT RATIO EEA/TPX | 180° INSTRON PEEL STRENGTH LBS/LINEAR INCH |
|---|---|
| 100/0 | 1.5 |
| 95/5 | 3.6 |
| 90/10 | 1.6 |
| 85/15 | 3.3 |
| 80/20 | 4.3 |
| 70/30 | 4.0 |
| 60/40 | 3.0 |
| 50/50 | 1.6 |

As is observed from the results, the adhesion between the polypropylene layers is initially low and never becomes very high. It generally increases as the TPX content is increased.

EXAMPLE 1

The multilayer article with an outer layer of bisphenol-A polycarbonate, an outer layer of polypropylene and an inner layer of a composition of EEA and TPX in varying concentrations joining the two outer layers was prepared.

TABLE 3

| TIE LAYER COMPOSITION WEIGHT RATIO EEA/TPX | 180° INSTRON PEEL STRENGTH LBS/LINEAR INCH | |
|---|---|---|
|  | AS IS | AUTOCLAVED |
| 100/0 | 5.6 | 3.8 |
| 95/5 | 6.9 | 2.8 |
| 90/10 | 8.3 | 5.0 |
| 85/15 | 5.6 | 4.9 |
| 80/20 | 9.4 | 9.0 |
| 70/30 | 7.8 | 4.7 |
| 60/40 | 2.6 | 0.8 |
| 50/50 | 1.6 | 0.9 |

As a small quantity of TPX is added, 5%, the basic adhesion goes up, however substantial adhesiveness is lost after autoclaving. As more TPX is added past the 5 weight percent level, the adhesion of the blended tie layer without the hydrolytic exposure of autoclaving remains at least essentially the same as 100 wt. % EEA or is higher, as much as 50% higher or more, see 80/20 tie layer composition. While this increase has occurred, which is contrary to the trend in Control 1, the retention of the adhesiveness after autoclaving also remains high, as high as 95% or more of the original adhesiveness, see 80/20 tie layer composition. Additionally many of the autoclaved compositions show adhesiveness which is essentially the same, less than 20% loss, as the original non-autoclaved 100% EEA. All the autoclaved samples adhesiveness in the preferred EEA/TPX range have greater values than the autoclaved 100% EEA.

EXAMPLE 2

A comparison of the clarity of tie layers after rigorous autoclaving conditions was done. Various five layers (two ties) films were evaluated. A 75 weight percent ethylene ethylacrylate 25 weight percent poly-(4-methylpentene-1) tie layer of 1 mil thickness was coextruded between bisphenol-A polycarbonate and polypropylene layers of 6 mil thickness to provide a structure of 6/1/6/1/6. Various films having a 100% ethylene ethylacrylate tie layer of between bisphenol-A polycarbonate and polypropylene were prepared. Thickness in mils of 5.5/0.5/10/0.5/5.5 (three samples) and 4/0.5/8.5/0.5/3 extruded at various temperatures were prepared.

The 100% ethylene ethylacrylate samples were autoclaved slightly above 121° C. and then visually inspected. Clarity in film was substantially reduced by what appeared to be snow flakes, i.e. opaque spots. The tie layer structures with the blend of ethylene ethylacrylate and poly-(4-methylpentene) were autoclaved at 132° C. The film remained clear even after autoclaving at a higher temperature than the 100% ethylene ethylacrylate.

What is claimed is:

1. A multilayer composition comprising an outer layer of aromatic polycarbonate, an outer layer of a polymer prepared from an olefinic monomer, said outer layers tied together with a layer comprising an admixture of an olefin acrylate polymer and poly-(4-methylpentene-1), the olefin acrylate and poly-(4-methylpentene-1) in such quantities that the adhesive strength and clarity of the tie layer is not significantly reduced after exposure to hydrolytic conditions at elevated temperatures.

2. A composition in accordance with claim 1 wherein the polycarbonate is bisphenol-A polycarbonate.

3. A composition in accordance with claim 1 wherein the olefinic monomer is not 4-methylpentene-1.

4. The composition in accordance with claim 3 wherein the aromatic polycarbonate is bisphenol-A polycarbonate, the olefinic monomer is propylene, the olefin acrylate is ethylene ethyl acrylate, said olefin acrylate present in the tie layer is from about 95 to about 65 weight percent.

5. A composition in accordance with claim 1 wherein the olefin acrylate to poly-(4-methylpentene-1) weight ratio is from about 95:5 to about 65:35.

6. A composition in accordance with claim 5 wherein the ratio is from about 92:8 to about 70:30.

7. A composition in accordance with claim 1 wherein the olefin in the olefin acrylate is ethylene and the acrylate is ethylacrylate.

8. The composition in accordance with claim 7 wherein the olefin is about 90 to about 60 weight percent of the olefin acrylate.

9. A composition comprising an outer layer of an aromatic polycarbonate, an outer layer of a polymer prepared from an olefinic monomer, said outer layers tied together with a layer comprising an admixture of an olefin acrylate and poly-(4-methylpentene-1) wherein the olefin acrylate is from about 65 to 95 weight percent.

* * * * *